United States Patent
Panicacci

(10) Patent No.: US 7,652,703 B2
(45) Date of Patent: Jan. 26, 2010

(54) DUAL PANEL PIXEL READOUT IN AN IMAGER

(75) Inventor: Roger Panicacci, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 589 days.

(21) Appl. No.: 10/887,880

(22) Filed: Jul. 12, 2004

(65) Prior Publication Data
US 2006/0007337 A1 Jan. 12, 2006

(51) Int. Cl.
H04N 3/14 (2006.01)
(52) U.S. Cl. .................................. 348/308; 348/296
(58) Field of Classification Search ................ 348/296, 348/301, 308, 319
See application file for complete search history.

(56) References Cited

U.S. PATENT DOCUMENTS

| 6,140,630 | A | 10/2000 | Rhodes |
| 6,204,524 | B1 | 3/2001 | Rhodes |
| 6,310,366 | B1 | 10/2001 | Rhodes et al. |
| 6,326,652 | B1 | 12/2001 | Rhodes |
| 6,333,205 | B1 | 12/2001 | Rhodes |
| 6,369,853 | B1 * | 4/2002 | Merrill et al. ............... 348/302 |
| 6,376,868 | B1 | 4/2002 | Rhodes |
| 6,466,265 | B1 * | 10/2002 | Lee et al. ..................... 348/308 |
| 6,657,665 | B1 * | 12/2003 | Guidash ..................... 348/308 |
| 6,956,605 | B1 * | 10/2005 | Hashimoto .................. 348/301 |
| 2001/0013900 | A1 | 8/2001 | Suzuki et al. |
| 2002/0018600 | A1 | 2/2002 | Lyon et al. |
| 2003/0011829 | A1 * | 1/2003 | Dierickx ..................... 358/513 |
| 2003/0043089 | A1 | 3/2003 | Hanson et al. |
| 2003/0201379 | A1 | 10/2003 | Stark |
| 2004/0032520 | A1 | 2/2004 | Andersson |
| 2004/0141078 | A1 * | 7/2004 | Yamaguchi ................. 348/308 |

FOREIGN PATENT DOCUMENTS

| EP | 1 017 106 A2 | 7/2000 |
| EP | 1 267 567 A1 | 12/2002 |
| EP | 1267567 A1 * | 12/2002 |
| JP | 2001045378 | 2/2001 |
| JP | 2001339646 | 12/2001 |
| JP | 2002064750 | 2/2002 |

* cited by examiner

*Primary Examiner*—Timothy J Henn
(74) *Attorney, Agent, or Firm*—Dickstein Shapiro LLP

(57) ABSTRACT

An imager having two panels of pixels (i.e., the imager's rows of pixels are split into two panels) that are controllable by separate row decoders. The dual panel architecture allows pipelining of pixel readout and column readout operations to improve the imager's frame rate. The dual panel architecture may use a standard pixel configuration, a shared column and/or a shared row and column configuration.

22 Claims, 9 Drawing Sheets

DUAL PANEL PIXEL READOUT IN AN IMAGER

FIELD OF THE INVENTION

The invention relates generally to imaging devices and more particularly to dual panel pixel readout in an imaging device.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

FIG. 1 illustrates a portion of a conventional CMOS imager 10. The illustrated imager 10 includes an array of pixels 20 connected to a column sample and hold circuit 42 by pixel output lines 32. The imager 10 also includes a row decoder and driver 40, column decoder 44, readout programmable gain amplifier (PGA) 50, an analog-to-digital converter (ADC) 55, an image processor 60 and a control circuit 70.

Under the control of the control circuit 70, row lines RL connected to a row of pixels 20 are selectively activated by the row decoder and driver 40. Each pixel 20 in the activated row outputs sequentially a reset $V_{rst}$ and pixel signal $V_{sig}$, not necessarily in that order, on a corresponding pixel output line 32. The column sample and hold circuit 42 samples, holds and then outputs the reset $V_{rst}$ and pixel signals $V_{sig}$ to the amplifier 50 as selected by the column decoder 44. A differential signal ($V_{rst}-V_{sig}$) is produced by the amplifier 50. The differential signal is digitized by the analog-to-digital converter 55. The analog-to-digital converter 55 supplies the digitized pixel signals to the image processor 60, which forms a digital image output.

Thus, every pixel 20 in a row is readout and input into the column sample and hold circuit 42, and then each column is serially (or sequentially) readout from the sample and hold circuit 42 for further processing. An exemplary timing diagram of the pixel readout and serial column readout is illustrated in FIG. 2. As can be seen from FIG. 2, row processing time $t_r$ is equal to $t_p+t_{cr}$, where $t_p$ is the time to readout the reset $V_{rst}$ and pixel signals $V_{sig}$ from the pixel 20 and $t_{cr}$ is the column readout time (i.e., total time to readout each column in a serial manner). An imager's frame rate (the inverse of the time required to readout an entire array) is dependent upon the row processing time $t_r$. It is desirable to improve an imager's frame rate. If $t_p$ is 6 μsecs and $t_{cr}$ is 42.67 μsecs (e.g., 2048 columns @ 48 Mhz), row processing time $t_r$ is 48.67 μsecs.

Accordingly, there is a desire to decrease row processing time so that an imager's frame rate can be improved.

SUMMARY

The invention provides an imager with decreased row processing time and improved frame rate.

Various exemplary embodiments of the invention provide an imager having two panels of pixels (i.e., the imager's rows of pixels are split into two panels) that are controllable by separate row decoders. The dual panel architecture allows pipelining of pixel readout and column readout operations to improve the imager's frame rate. The dual panel architecture may use a standard pixel configuration, a shared column and/or a shared row and column configuration.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 3:
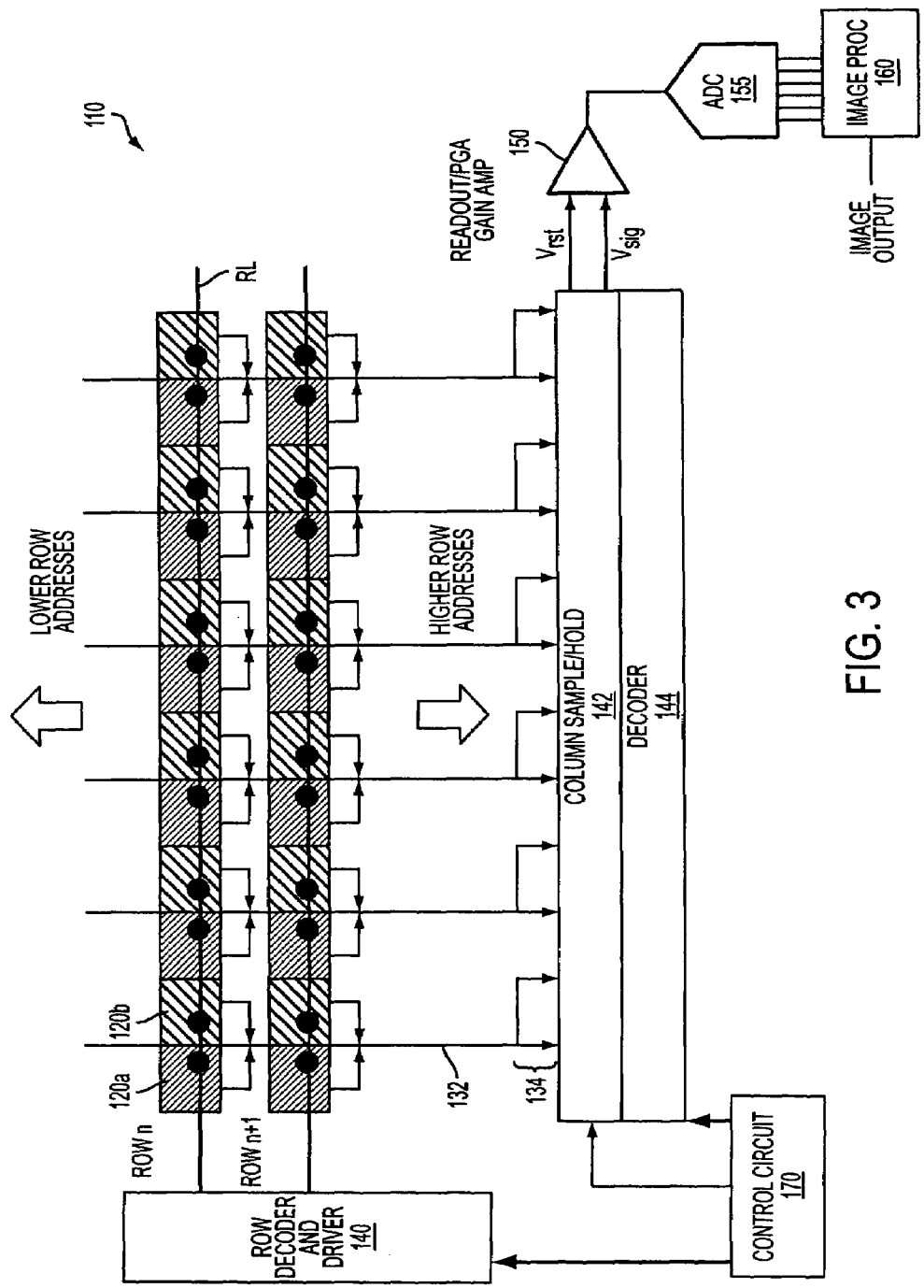
FIG. 3 is a diagram of another CMOS imager.

Referring to the figures, where like reference numbers designate like elements, FIG. 3 shows an imager 110 having a shared pixel architecture. That is, two neighboring pixels 120a, 120b in the same row share readout circuitry such that their reset and pixel signals can be output to the same column's pixel output line 132. This is done to improve fill factor of the pixels 120a, 120b, but as is discussed below with respect to FIG. 4, it does not improve row processing time.

The illustrated imager 110 includes a column sample and hold circuit 142 connected to the pixel output lines 132 by multiplexers 134. Multiplexers 134 are required to ensure that the signals from each pixel 120a, 120b are sampled and held by appropriate circuitry within the column sample and hold circuitry 142. The imager 110 also includes a row decoder and driver 140, column decoder 144, readout programmable gain amplifier (PGA) 150, an analog-to-digital converter (ADC) 155, an image processor 160 and a control circuit 170.

Under the control of the control circuit 170, row lines RL connected to a row of pixels 120a, 120b are selectively and sequentially activated by the row decoder and driver 140. Each pair of pixels 120a, 120b in the activated row outputs its reset $V_{rst}$ and pixel signals $V_{sig}$ onto a corresponding pixel output line 132 (at appropriate separate reset and pixel readout stages). The multiplexer 134 ensures that the column sample and hold circuitry 142 inputs the reset and pixel signals $V_{rst}$, $V_{sig}$ from the pixels 120a, 120b in the correct order.

The column sample and hold circuit 142, samples, holds and then outputs the reset $V_{rst}$ and pixel signals $V_{sig}$ to the amplifier 150 as selected by the decoder 144. A differential signal ($V_{rst}$–$V_{sig}$) is produced by the amplifier 150. The differential signal is digitized by the analog-to-digital converter 155. The analog-to-digital converter 155 supplies the digitized pixel signals to the image processor 160, which forms a digital image output.

Figure 4:
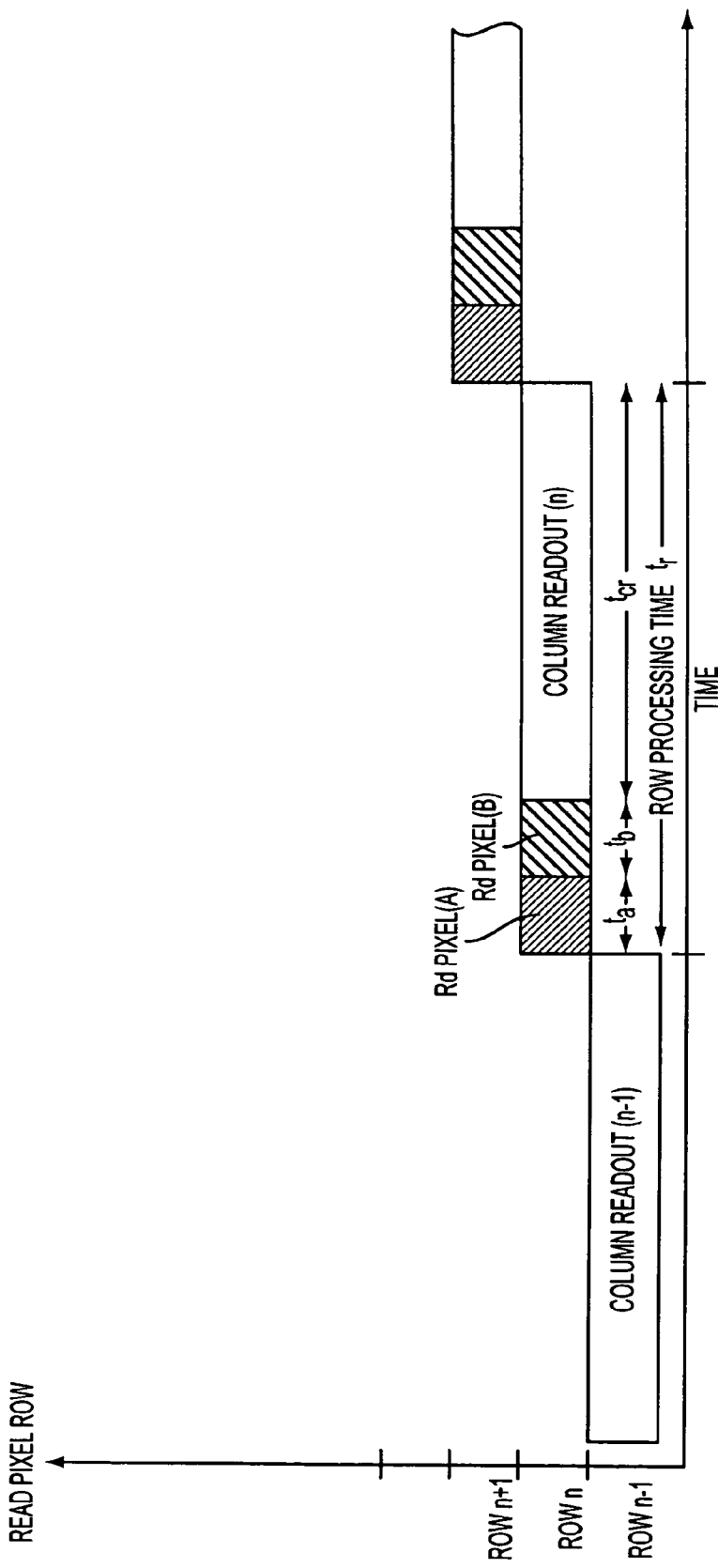
FIG. 4 is a timing diagram of the operation of the FIG. 3 imager.

Thus, every pair of pixels 120a, 120b in a row is readout and input into the column sample and hold circuit 142, and then each column is serially (or sequentially) readout from the sample and hold circuit 142 for further processing. An exemplary timing diagram of the pixel readout and serial column readout of the imager 110 is illustrated in FIG. 4. As can be seen from FIG. 4, row processing time $t_r$ is equal to $t_a + t_b + t_{cr}$, where $t_a$ is the time to readout the reset $V_{rst}$ and pixel signals $V_{sig}$ from the first pixel 120a, $t_b$ is the time to readout the reset $V_{rst}$ and pixel signals $V_{sig}$ from the second pixel 120b, and $t_{cr}$ is the column readout time (i.e., total time to readout each column in a serial manner). If $t_a$ is 6 µsecs, $t_b$ is 6 µsecs and $t_{cr}$ is 42.67 µsecs (e.g., 2048 columns @ 48 Mhz), row processing time $t_r$ is 54.67 µsecs.

Thus, even though fill factor has improved, the row processing time of the imager 110 (FIG. 3) has increased, which has decreased the imager's 110 frame rate. This results from the serial readout of the first and second pixels 120a, 120b, followed by the serial column readout operation. It is desirable to improve the imager 110 such that it maintains its improved fill factor, yet also has improved row processing time and frame rate.

To make the imager's 110 frame rate insensitive to the increased time for pixel readout, it is proposed to pipeline the pixel readout and column readout sequences rather than having them occur serially. Existing pipelining architectures require extra sample and hold circuits per column. This increased column complexity requires additional chip area, which is undesirable.

These architectures also contain column parallel gain circuits, which have storage capacitors at the amplifier output. In operation, after the signal is amplified, a subsequent analog-to-digital conversion step is performed. During the conversion, the sample and hold circuits prior to the gain circuits are available for reading out the next row of pixels. Thus, pipelined pixel readout with analog-to-digital conversion is possible. Unfortunately, with serial column readout and analog-to-digital conversion, the next row of pixels to be readout cannot be processed until the current sampled row is readout completely. As such, the existing pipelining architecture is not desirable.

Figure 5:
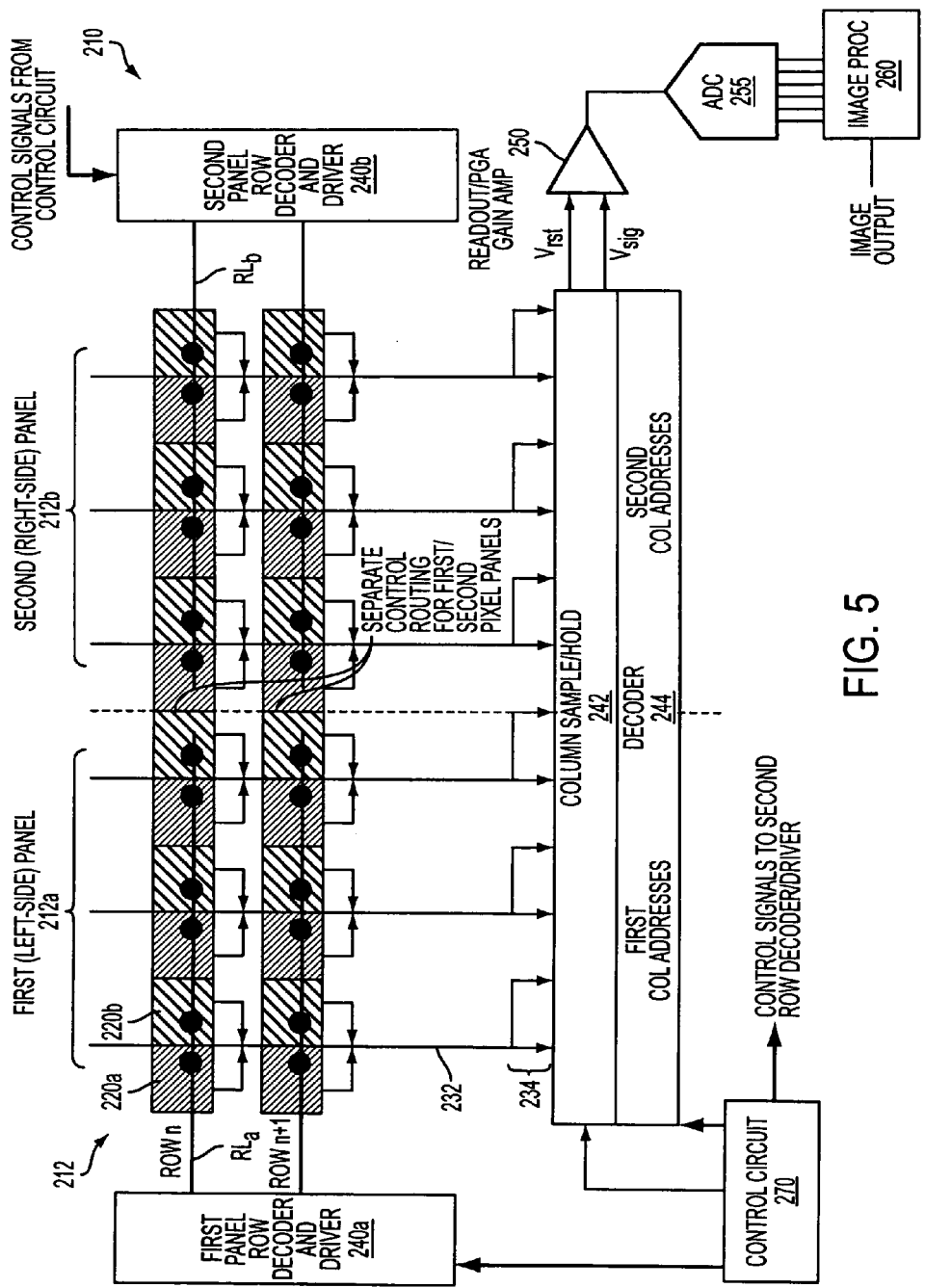
FIG. 5 is a diagram of a CMOS imager constructed in accordance with an exemplary embodiment of the invention.

FIG. 5 illustrates a CMOS imager 210 constructed in accordance with an exemplary embodiment of the invention. The illustrated imager 210 uses a unique configuration and pipelining to improve row processing time and frame rate without increasing column circuitry complexity and area used. The illustrated imager 210 uses a dual panel pixel array 212, consisting of a first panel 212a and a second panel 212b, and separate dedicated row decoders and drivers 240a, 240b to operate the panels in a manner that allows pixel readout and column readout to be pipelined (described below in more detail with respect to FIG. 6).

The illustrated imager 210 has a shared pixel architecture. That is, two neighboring pixels 220a, 220b in the same row share readout circuitry such that their reset and pixel signals can be output to the same column's pixel output line 232. This is done to improve fill factor of the pixels 220a, 220b. The imager 210 also includes a column sample and hold circuit 242 connected to the pixel output lines 232 by multiplexers 234. Multiplexers 234 ensure that the $V_{rst}$, $V_{sig}$ signals from each pixel 220a, 220b are sampled and held by appropriate circuitry within the column sample and hold circuitry 242. The imager 210 also includes a column decoder 244, readout programmable gain amplifier (PGA) 250, an analog-to-digital converter (ADC) 255, an image processor 260 and a control circuit 270.

The column decoder 244 generates column addresses to address the columns associated with the first panel 212a and the second panel 212b. The column sample and hold circuitry 242 also has separate controls for the first and second panels 212a, 212b.

Under the control of the control circuit 270, row lines RLa connected to a row of pixels 220a, 220b in the first panel 212a are selectively activated by the first row decoder and driver 240a. Each pair of pixels 220a, 220b in the activated row outputs its reset $V_{rst}$ and pixel signals $V_{sig}$ onto a corresponding pixel output line 232 (at appropriate separate reset and pixel readout stages). The multiplexer 234 ensures that the column sample and hold circuitry 242 inputs the reset signal $V_{rst}$ from the first pixel 220a, followed by the pixel signal $V_{sig}$ from the first pixel 220a of the pair. The multiplexer 234 then ensures that the column sample and hold circuitry 242 inputs the reset signal $V_{rst}$ from the second pixel 220b, followed by the pixel signal $V_{sig}$ from the second pixel 220b of the pair.

Similarly, under the control of the control circuit 270, row lines RLb connected to a row of pixels 220a, 220b in the second panel 212b are selectively activated by the second row decoder and driver 240b. Each pair of pixels 220a, 220b in the activated row outputs its reset and pixel signals $V_{rst}$, $V_{sig}$ onto a corresponding pixel output line 232 (at appropriate separate reset and pixel readout stages). The multiplexer 234 ensures that the column sample and hold circuitry 242 initially inputs the reset signal $V_{rst}$ from the first pixel 220a, followed by the pixel signal $V_{sig}$ from the first pixel 220a of the pair. The multiplexer 234 then ensures that the column sample and hold circuitry 242 inputs the reset signal $V_{rst}$ from the second pixel 220b, followed by the pixel signal $V_{sig}$ from the second pixel 220b of the pair.

The column sample and hold circuit 242, samples, holds and outputs, to the amplifier 250, the reset $V_{rst}$ and pixel signals $V_{sig}$ from the first panel 212a and the second panel 212b (described below with respect to FIG. 6). A differential signal ($V_{rst}$–$V_{sig}$) is produced by the amplifier 250. The differential signal is digitized by the analog-to-digital converter 255. The analog-to-digital converter 255 supplies the digitized pixel signals to the image processor 260, which forms a digital image output.

Figure 6:
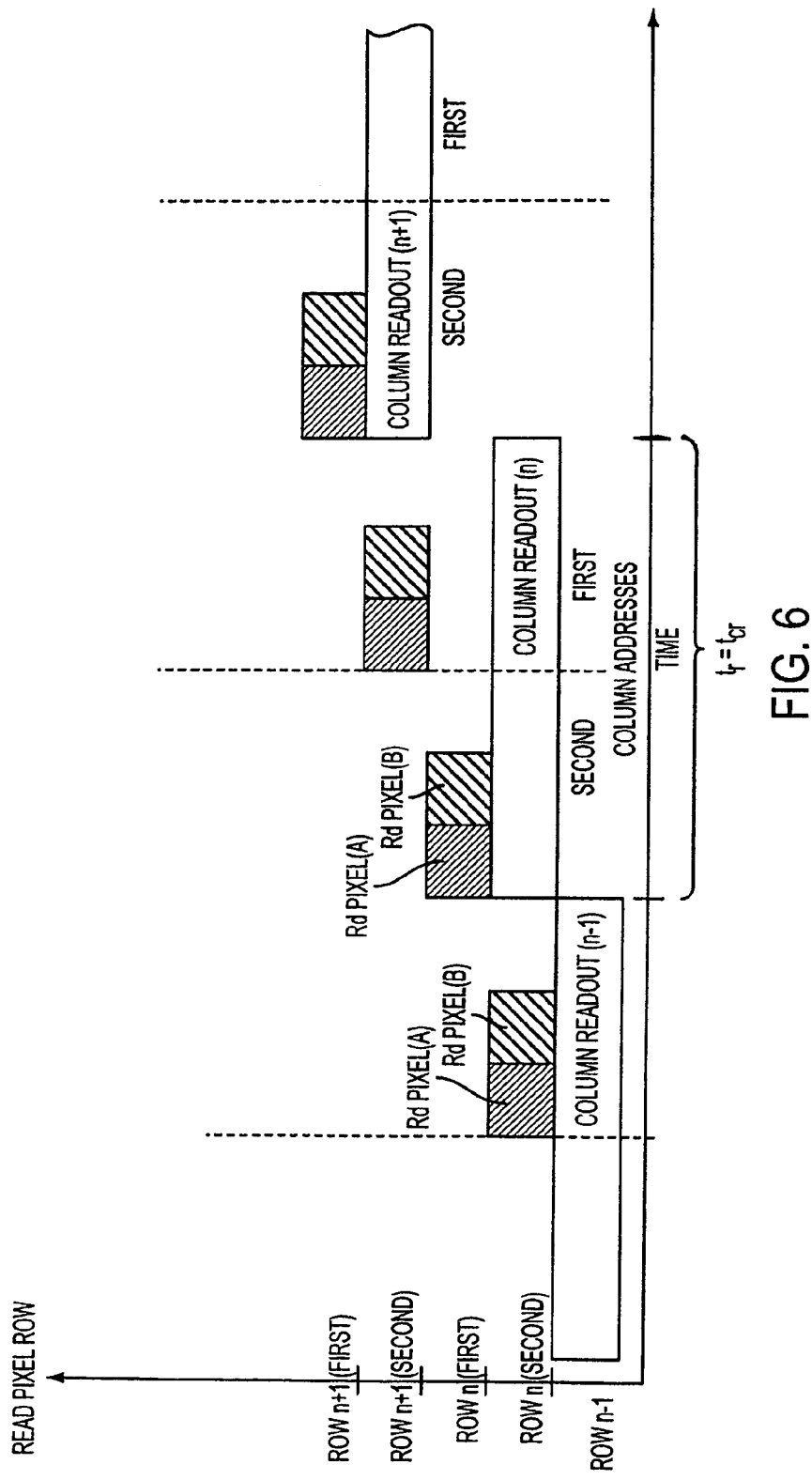
FIG. 6 is an exemplary timing diagram of the operation of the FIG. 5 imager.

Referring to FIG. 6, an example of the pipelined manner in which the pixel readout and column readout operations of the invention occur is now explained. When the current row ROW (N) of pixels is being readout, the second panel's pixels are readout first. Meanwhile, column readout of the stored signals from the first panel from a prior row ROW(N–1) is performed. Once the second panel's pixel signals are readout, the first panel's pixels for the current row ROW(N) are readout. At the same time, column readout of the stored signals from the second panel from the current row ROW(N) is performed. Afterwards, when pixel readout of the second panel's pixels for the next row ROW(N+1) is being performed, column readout of the stored signals from the first panel for ROW(N) is performed. Thus, as can be seen from FIG. 6, the row processing time $t_r$ has been reduced to the column readout time $t_{cr}$, which is a vast improvement over other imagers row processing times. If $t_{cr}$ is 42.67 μsecs (e.g., 2048 columns @ 48 Mhz), row processing time $t_r$ is 42.67 μsecs. This reduced row processing time $t_r$ yields an improved frame rate for the imager 210 of the invention.

Figure 1:
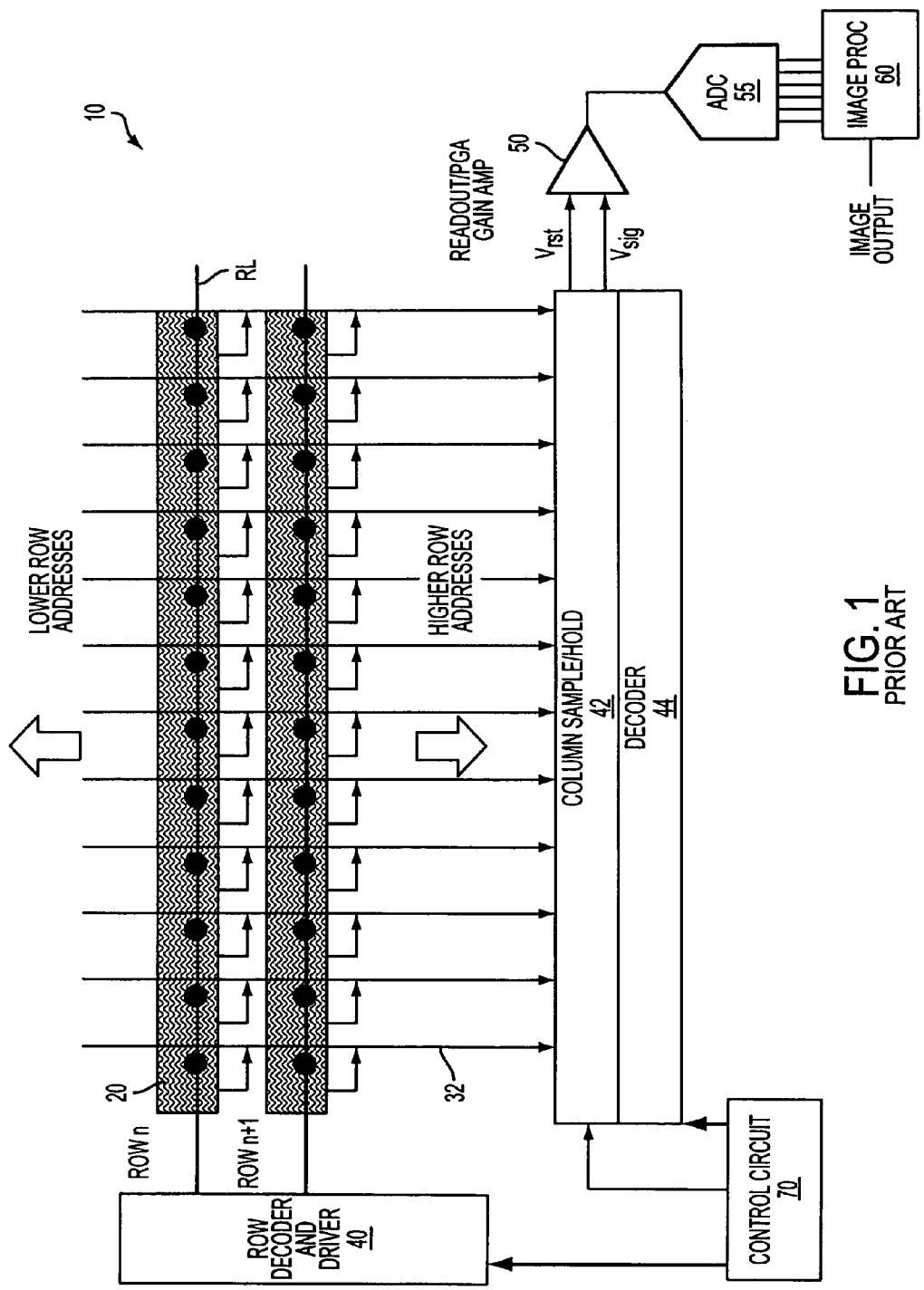
FIG. 1 is a diagram of a CMOS imager.
Figure 2:
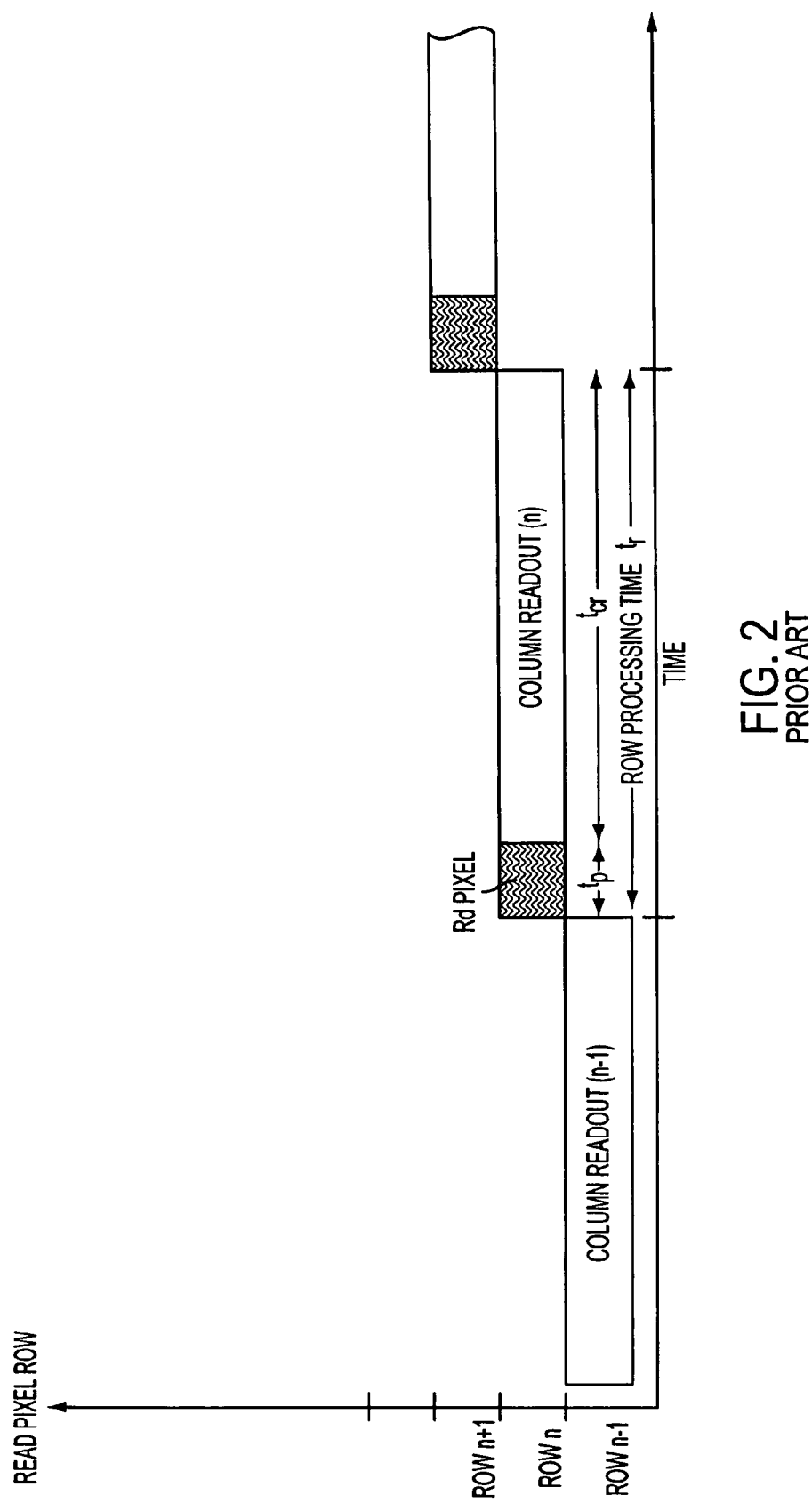
FIG. 2 is a timing diagram of the operation of the FIG. 1 imager.
Figure 7:
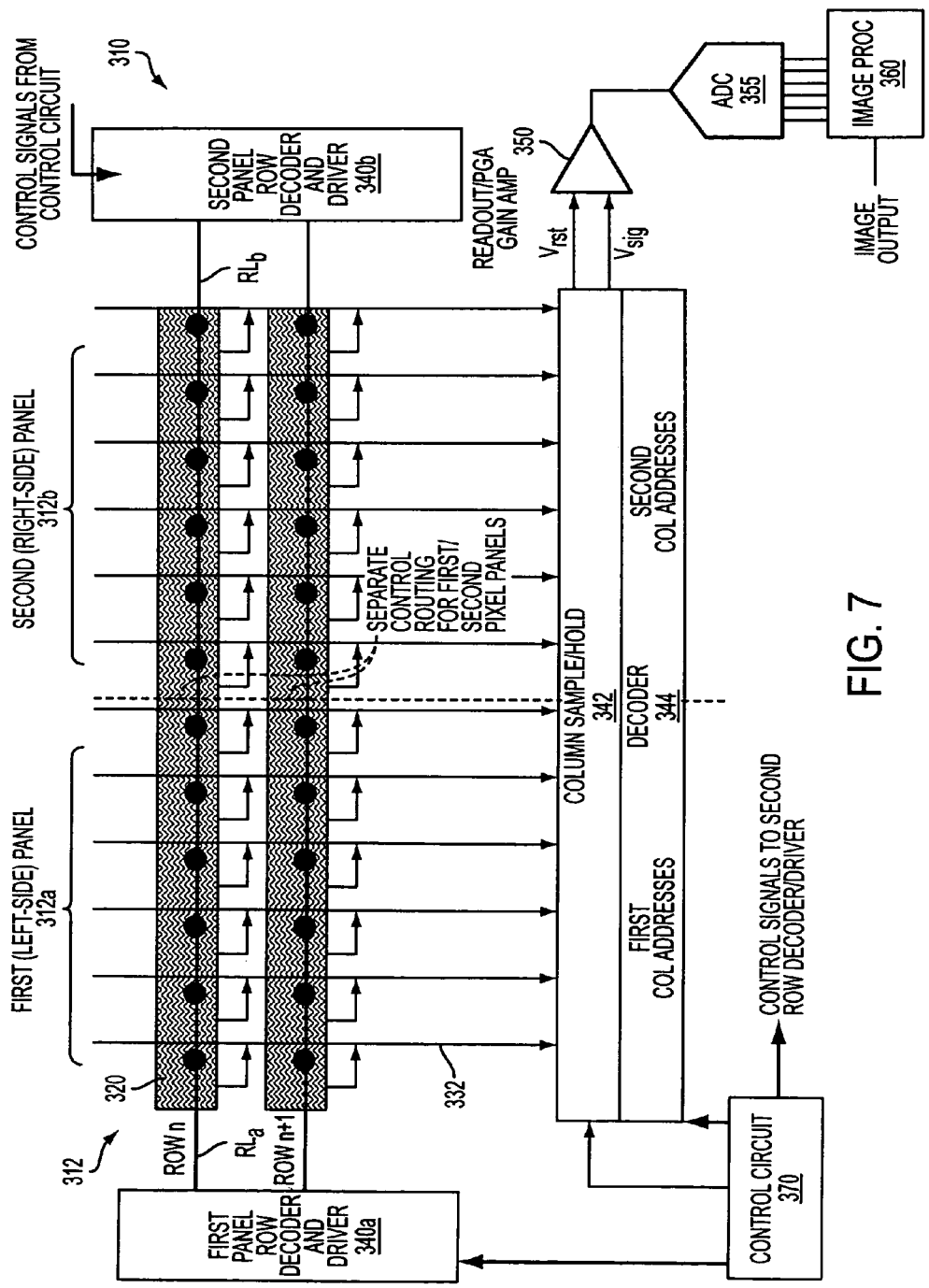
FIG. 7 is a diagram of a CMOS imager constructed in accordance with another exemplary embodiment of the invention.

FIG. 7 is a diagram of a CMOS imager 310 constructed in accordance with another exemplary embodiment of the invention. The illustrated imager 310 uses the unique dual panel array 312 configuration and pipelining to improve row processing time and frame rate without increasing column circuitry complexity and area used. The illustrated imager 310 uses a dual panel array 312, consisting of a first panel 312a and a second panel 312b, and separate dedicated row decoders and drivers 340a, 340b to operate the panels in a manner that allows pixel readout and column readout to be pipelined. In the illustrated embodiment, the imager 310 includes panels 312a, 312b using the conventional non-shared pixel configuration illustrated in FIG. 1. It should be noted that because the imager 310 uses the dual panel array 312, respective row decoders and drivers 340a, 340b and pipelining, the imager 310 will have improved row processing time and frame rate as illustrated in FIG. 6.

The illustrated imager 310 also includes a column sample and hold circuit 342 connected to each column of pixels 320 by pixel output lines 332. Multiplexers are not required because each column of pixels has its own output circuitry and pixel output line 332. The imager 310 also includes a column decoder 344, readout programmable gain amplifier (PGA) 350, an analog-to-digital converter (ADC) 355, an image processor 360 and a control circuit 370.

The column decoder 344 generates column addresses to address the columns associated with the first panel 312a and the columns associated with the second panel 312b. The column sample and hold circuitry 342 also has separate controls for the first and second panels 312a, 312b.

Under the control of the control circuit 370, row lines RLa connected to a row of pixels 320 in the first panel 312a are selectively activated by the first row decoder and driver 340a. Each pixel 320 in the activated row outputs its reset $V_{rst}$ and pixel signals $V_{sig}$ onto a corresponding pixel output line 332 (at appropriate separate reset and pixel readout stages).

Under the control of the control circuit 370, row lines RLb connected to a row of pixels 320 in the second panel 312b are selectively activated by the second row decoder and driver 340b. Each pixel 320 in the activated row outputs its reset $V_{rst}$ and pixel signals $V_{sig}$ onto a corresponding pixel output line 332 (at appropriate separate reset and pixel readout stages).

The column sample and hold circuit 342, samples, holds and outputs, to the amplifier 350, the reset $V_{rst}$ and pixel signals $V_{sig}$ from the first panel 312a and the second panel 312b as described above with respect to FIG. 6. A differential signal ($V_{rst}$-$V_{sig}$) is produced by the amplifier 350. The differential signal is digitized by the analog-to-digital converter 355. The analog-to-digital converter 355 supplies the digitized pixel signals to the image processor 360, which forms a digital image output.

Figure 8:
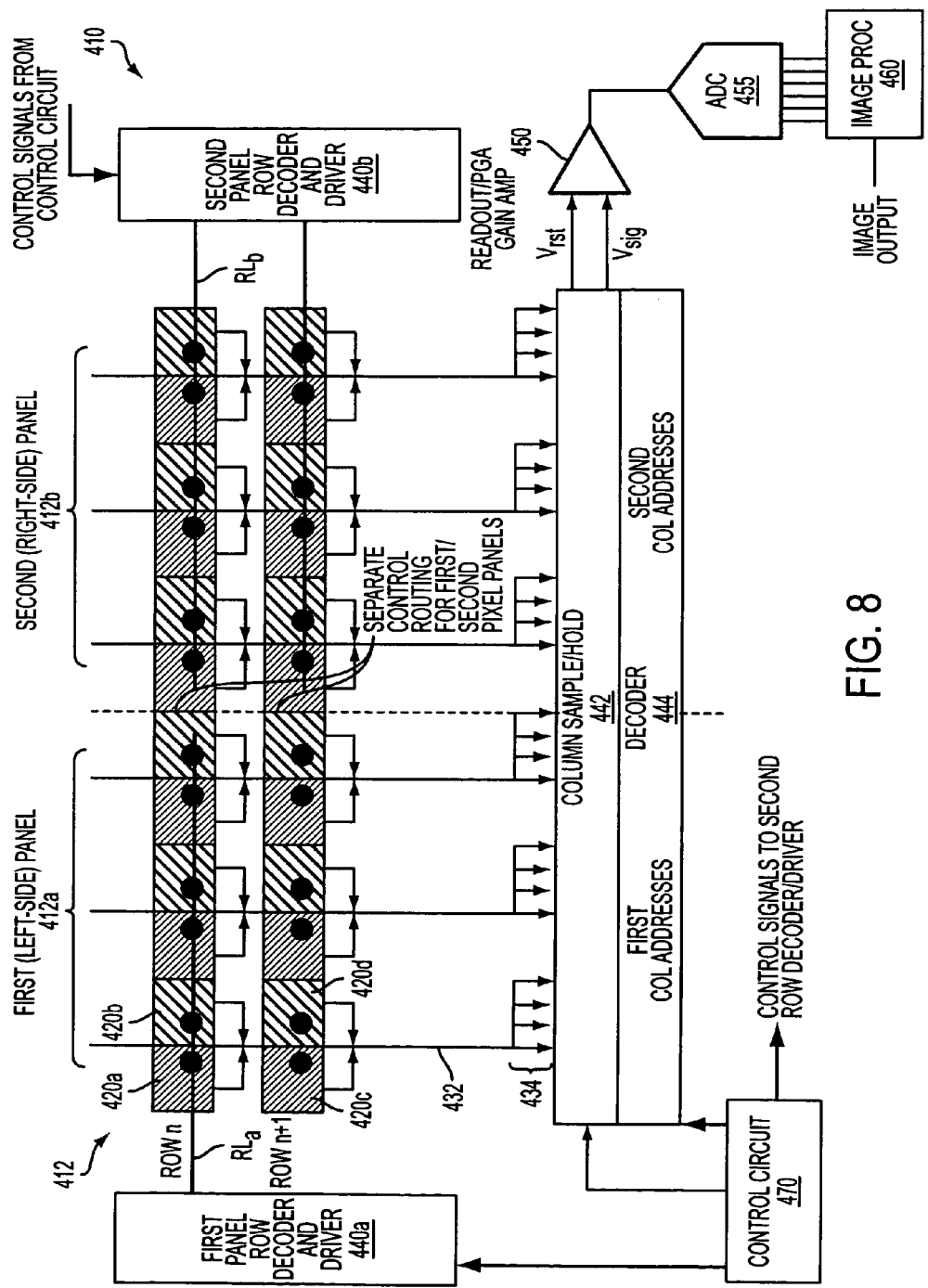
FIG. 8 is a diagram of a CMOS imager constructed in accordance with yet another exemplary embodiment of the invention.

FIG. 8 is a diagram of a CMOS imager 410 constructed in accordance with yet another exemplary embodiment of the invention. The illustrated imager 410 uses a unique configuration and pipelining to improve row processing time and frame rate without increasing column circuitry complexity and area used. The illustrated imager 410 uses a dual panel array 412, consisting of a first panel 412a and a second panel 412b, and separate dedicated row decoders and drivers 440a, 440b to operate the panels in a manner that allows pixel readout and column readout to be pipelined.

The illustrated imager 410 has a combined shared-row/column pixel readout architecture such as one of the architectures disclosed in application Ser. Nos. 10/721,190 and 10/721,191, also assigned to Micron Technology, Inc., the disclosures of which are hereby incorporated by reference in their entirety. That is, two neighboring pixels 420a, 420b in a row and two neighboring pixels 420c, 420d in the adjacent row share readout circuitry such that their reset and pixel signals can be output to the same column's pixel output line 432. This is done to improve fill factor of the pixels 420a, 420b, 420c, 420d. The imager 410 also includes a column sample and hold circuit 442 connected to the pixel output lines 432 by multiplexers 434. Multiplexers 434 are required to ensure that the signals from each pixel 420a, 420b, 420c, 420d are sampled and held by appropriate circuitry within the column sample and hold circuitry 442. The imager 410 also includes a column decoder 444, readout programmable gain amplifier (PGA) 450, an analog-to-digital converter (ADC) 455, an image processor 460 and a control circuit 470.

The column decoder 444 generates column addresses to address the columns associated with the first panel 412a and the columns associated with the second panel 412b. Similar to the other embodiments of the invention, the column sample and hold circuitry 442 also has separate controls for the first and second panels 412a, 412b.

Under the control of the control circuit 470, row lines RLa connected to a row of pixels 420a, 420b in the first panel 412a are selectively activated by the first row decoder and driver 440a. Each pair of pixels 420a, 420b in the activated row outputs its reset $V_{rst}$ and pixel signals $V_{sig}$ onto a corresponding pixel output line 432 (at appropriate separate reset and pixel readout stages). Row lines RLa connected to the adjacent row of pixels 420c, 420d in the first panel 412a are selectively activated by the first row decoder and driver 440a. Each pair of pixels 420c, 420d, in the activated adjacent row also outputs its reset $V_{rst}$ and pixel signals $V_{sig}$ onto a corresponding pixel output line 432 (at appropriate separate reset and pixel readout stages).

Similarly, under the control of the control circuit 470, row lines RLb connected to a row of pixels 420a, 420b in the second panel 412b are selectively activated by the second row decoder and driver 440b. Each pair of pixels 420a, 420b in the activated row outputs its reset $V_{rst}$ and pixel signals $V_{sig}$ onto a corresponding pixel output line 432 (at appropriate separate reset and pixel readout stages). Row lines RLb connected to the adjacent row of pixels 420c, 420d in the second panel 412b are selectively activated by the second row decoder and driver 440b. Each pair of pixels 420c, 420d, in the activated adjacent row also outputs its reset $V_{rst}$ and pixel signals $V_{sig}$ onto a corresponding pixel output line 432 (at appropriate separate reset and pixel readout stages).

The column sample and hold circuit 442, samples, holds and outputs, to the amplifier 450, the reset $V_{rst}$ and pixel signals $V_{sig}$ from the first panel 412a and the second panel 412b in the pipelined manner described above with respect to FIG. 6. A differential signal ($V_{rst}$-$V_{sig}$) is produced by the amplifier 450. The differential signal is digitized by the analog-to-digital converter 455. The analog-to-digital converter 455 supplies the digitized pixel signals to the image processor 460, which forms a digital image output.

It should be noted that careful placement of the pixels in the dual panel arrays of the invention prevents the boundary between the panels from creating image artifacts (due to discontinuity between the pixels). One desirable technique is to route the metal control wires under an upper metal shield (upper metal shielding is commonly used for power routing in the pixel). Then, the gap between control lines impacts how much light strikes the panel.

The present invention has the additional benefit of reducing the loading on the row decoder/driver circuits. Reduced loading leads to faster pixel readout times. Timing to the separate row decoders and drivers can be made the same in the case that pipelined pixel readout id not desired or required.

It should be appreciated that the invention can utilize many panel configurations and is not to be limited to a dual panel construction. That is, the panels used in the invention can comprise 2, 3, 4, or more panels as deemed appropriate for the application. All that is required is that each panel be driven by its own row decoder and that the column S/H circuitry and control circuitry be configured to operate the panels as described above.

Figure 9:
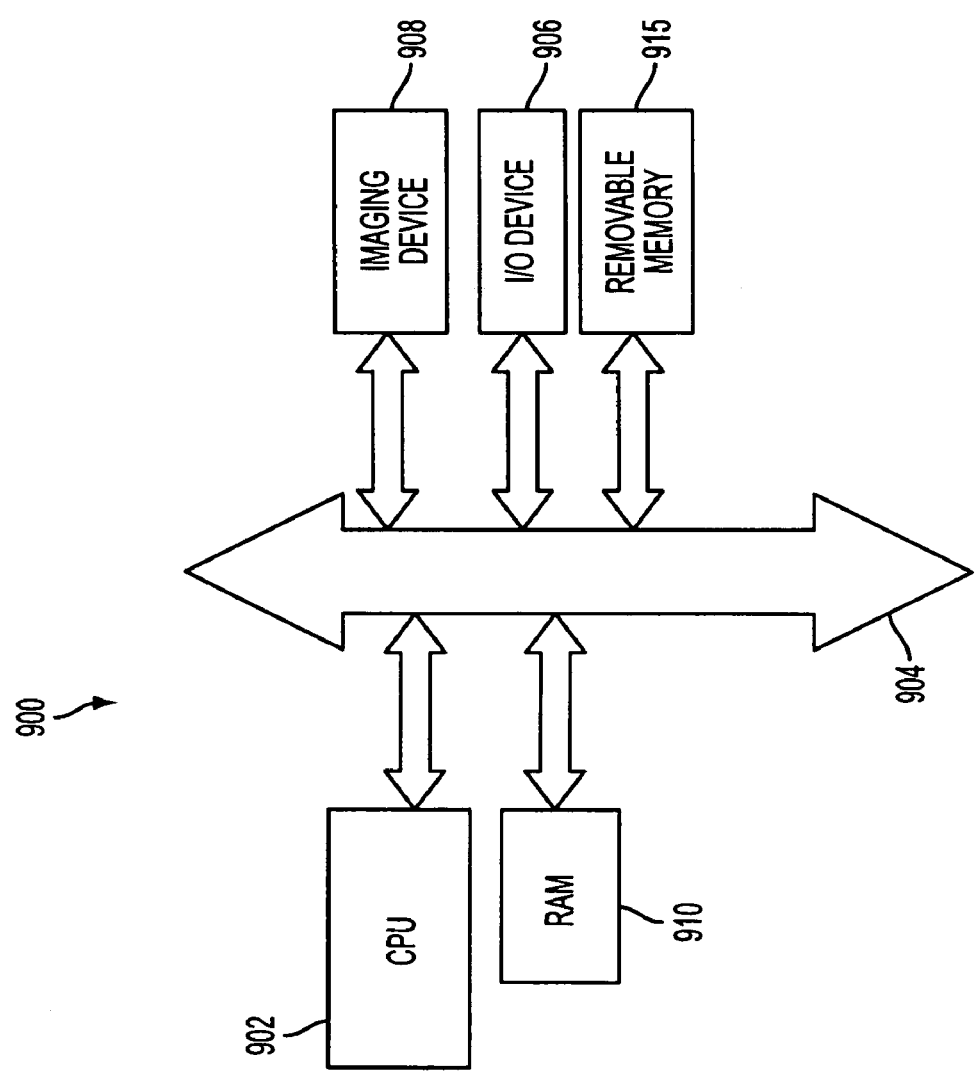
FIG. 9 shows a processor system incorporating at least one imaging device constructed in accordance with an embodiment of the invention.

FIG. 9 shows system 900, a typical processor system modified to include an imaging device 908 constructed in accordance with an embodiment of the invention (i.e., imagers 210, 310, 410 described above). The processor-based system 900 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 900, for example a camera system, generally comprises a central processing unit (CPU) 902, such as a microprocessor, that communicates with an input/output (I/O) device 906 over a bus 904. Imaging device 908 also communicates with the CPU 902 over the bus 904. The processor-based system 900 also includes random access memory (RAM) 910, and can include removable memory 915, such as flash memory, which also communicate with the CPU 902 over the bus 904. The imaging device 908 may be combined with a processor, such as a CPU, digital signal processor, or microprocessor, with or without memory storage on a single integrated circuit or on a different chip than the processor.

It should be appreciated that other embodiments of the invention include a method of fabricating the imaging devices 210, 310, 410 illustrated in FIGS. 5, 7, and 8. For example, in one exemplary embodiment, a method of integrating an imaging device comprises fabricating an array of pixels in at least two panels and fabricating a readout circuit coupled to the panel, the readout circuit enabling pipelined readout of the panels.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An imaging device comprising:
    an array of pixels comprising first and second panels, each panel being organized into a plurality of rows and columns, a first side of said first panel being adjacent a first side of said second panel, said pixels of each row are organized into pairs and each pair shares readout circuitry and a respective output line;
    a first row decoder connected to the rows of said first panel, said first row decoder being adjacent to a second side of said first panel opposite the first side of said first panel;
    a second row decoder connected to the rows of said second panel, said second row decoder being adjacent to a second side of said second panel opposite the first side of said second panel, said first and second row decoders being configured to respectively and independently activate rows within said first and second panels;
    sample and hold circuitry connected to the columns of the first and second panels; and
    a column decoder connected to said sample and hold circuitry, said column decoder being controlled to address said sample and hold circuitry such that pixel readout from the first and second panels and column readout of stored signals are pipelined,
    said sample and hold circuitry configured to simultaneously sample signals corresponding to pixels of a row n of said first panel and output sampled signals corresponding to row n of said second panel, and
    said sample and hold circuitry further configured to simultaneously sample signals corresponding to pixels of a row n+1 of said second panel and output the sampled signals corresponding to the pixels of the row n of said first panel, wherein n is an integer.

2. The device of claim 1 further comprising a plurality of multiplexers connected between the output lines and said sample and hold circuitry.

3. The device of claim 1, wherein each pair of pixels in a first row is associated with a pair of pixels in an adjacent row and shares readout circuitry and a respective output line with the associated pair.

4. The device of claim 3 further comprising a plurality of multiplexers connected between the output lines and said sample and hold circuitry.

5. The device of claim 1, wherein said column decoder provides first addresses to said sample and hold circuit, the first addresses corresponding to columns within said first panel.

6. The device of claim 5, wherein said column decoder provides second addresses to said sample and hold circuit, the second addresses corresponding to columns within said second panel.

7. The device of claim 1, wherein said stored signals comprise reset and pixel signals from said first and second panels.

8. The device of claim 1, wherein said pixels are CMOS imaging pixels.

9. An imaging device comprising:
    first and second panels of pixels, each panel being organized into a plurality of rows and columns, a first side of said first panel being adjacent a first side of said second panel, said pixels of each row are organized into pairs and each pair shares readout circuitry and a respective output line;
    first means for activating the rows of said first panel, said first means being adjacent to a second side of said first panel opposite the first side of said first panel;
    second means for activating the rows of said second panel, said second means being adjacent to a second side of said second panel opposite the first side of said second panel, said first and second activating means respectively and independently activating rows within said first and second panels;

sample and hold means for sampling and holding signals from said first and second panels; and means for controlling said sample and hold means such that pixel readout and column readout operations are pipelined, said sample and hold means configured to simultaneously sample signals corresponding to pixels of a row n of said first panel and output sampled signals corresponding to row n of said second panel, and said sample and hold means further configured to simultaneously sample signals corresponding to pixels of a row n+1 of said second panel and output the sampled signals corresponding to the pixels of the row n of said first panel, wherein n is an integer.

10. The device of claim 9 further comprising a plurality of multiplexers connected between the output lines and said sample and hold means.

11. The device of claim 9, wherein each pair of pixels in a first row is associated with a pair of pixels in an adjacent row and shares readout circuitry and a respective output line with the associated pair.

12. The device of claim 11 further comprising a plurality of multiplexers connected between the output lines and said sample and hold means.

13. The device of claim 9, wherein said controlling means comprises a column decoder that provides first addresses to said sample and hold circuit means, the first addresses corresponding to columns within said first panel.

14. The device of claim 13, wherein said column decoder provides second addresses to said sample and hold means, the second addresses corresponding to columns within said second panel.

15. A processor system comprising:

a processor; and an imaging device coupled to said processor, said imaging device comprising:

an array of pixels comprising first and second panels, each panel being organized into a plurality of rows and columns, a first side of said first panel being adjacent a first side of said second panel, said pixels of each row are organized into pairs and each pair shares readout circuitry and a respective output line, a first row decoder connected to the rows of said first panel, said first row decoder being adjacent to a second side of said first panel opposite the first side of said first panel, a second row decoder connected to the rows of said second panel, said second row decoder being adjacent to a second side of said second panel opposite the first side of said second panel, said first and second row decoders being configured to respectively and independently activate rows within said first and second panels, sample and hold circuitry connected to the columns of the first and second panels, and a column decoder connected to said sample and hold circuitry, said column decoder being controlled to address said sample and hold circuitry such that pixel readout from the first and second panels and column readout of stored signals are pipelined, said sample and hold circuitry configured to simultaneously sample signals corresponding to pixels of a row n of said first panel and output sampled signals corresponding to row n of said second panel, and said sample and hold circuitry further configured to simultaneously sample signals corresponding to pixels of a row n+1 of said second panel and output the sampled signals corresponding to the pixels of the row n of said first panel, wherein n is an integer.

16. The system of claim 15 further comprising a plurality of multiplexers connected between the output lines and said sample and hold circuitry.

17. The system of claim 15, wherein each pair of pixels in a first row is associated with a pair of pixels in an adjacent row and shares readout circuitry and a respective output line with the associated pair.

18. The system of claim 17 further comprising a plurality of multiplexers connected between the output lines and said sample and hold circuitry.

19. The system of claim 15, wherein said column decoder provides first addresses to said sample and hold circuit, the first addresses corresponding to columns within said first panel.

20. The system of claim 19, wherein said column decoder provides second addresses to said sample and hold circuit, the second addresses corresponding to columns within said second panel.

21. The system of claim 15, wherein said stored signals comprise reset and pixel signals from said first and second panels.

22. The system of claim 15, wherein said pixels comprise CMOS imaging pixels.

* * * * *

UNITED STATES PATENT AND TRADEMARK OFFICE
CERTIFICATE OF CORRECTION

PATENT NO. : 7,652,703 B2 Page 1 of 1
APPLICATION NO. : 10/887880
DATED : January 26, 2010
INVENTOR(S) : Roger Panicacci It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Twenty-eighth Day of December, 2010

David J. Kappos
*Director of the United States Patent and Trademark Office*